(12) United States Patent
Adam et al.

(10) Patent No.: US 6,534,597 B2
(45) Date of Patent: Mar. 18, 2003

(54) POLYMERIZABLE COMPOUNDS AND USE THEREOF

(75) Inventors: Herve Adam, Princeton, NJ (US); Hui Shirley Yang, East Windsor, NJ (US); Jonathan D. Kiplinger, Bordentown, NJ (US); Eugene J. Anderson, Jr., Marlton, NJ (US); Ning Chen, Plainsboro, NJ (US); Robert Lee Reierson, West Windsor, NJ (US)

(73) Assignee: Rhodia, Inc., Cranbury, NJ (US)

( * ) Notice: Subject to any disclaimer, the term of this patent is extended or adjusted under 35 U.S.C. 154(b) by 0 days.

(21) Appl. No.: 09/887,675

(22) Filed: Mar. 29, 2001

(65) Prior Publication Data

US 2002/0123588 A1 Sep. 5, 2002

Related U.S. Application Data

(60) Provisional application No. 60/193,874, filed on Mar. 31, 2000.

(51) Int. Cl.[7] ............................. C08F 2/24; C08F 8/40; C08F 275/00; C08C 19/24
(52) U.S. Cl. ................. 525/340; 525/287; 525/255; 525/538; 526/277; 528/286; 528/287; 528/398
(58) Field of Search ................ 525/340, 538, 525/287, 255; 526/277; 528/286, 287, 398; 524/710

(56) References Cited

U.S. PATENT DOCUMENTS

| | | | |
|---|---|---|---|
| 3,855,364 A | * | 12/1974 | Steckler |
| 4,101,490 A | | 7/1978 | Pons et al. ............... 260/29.6 |
| 5,151,125 A | | 9/1992 | Kuwajima et al. .......... 106/503 |
| 5,550,274 A | | 8/1996 | Reierson ................... 558/110 |

FOREIGN PATENT DOCUMENTS

| | | | |
|---|---|---|---|
| EP | 0 458 245 A1 | 11/1991 | ......... C09D/143/02 |
| EP | 0675076 A2 | 10/1995 | ........... C01B/25/24 |
| FR | 2 325 662 | 9/1976 | ............. C08F/2/24 |
| WO | WO 99/46337 | 9/1999 | ............. C09D/5/02 |

OTHER PUBLICATIONS

International Search Report. PCT/US01/10099. Dated Nov. 15, 2001.

* cited by examiner

*Primary Examiner*—James J. Seidleck
*Assistant Examiner*—Olga Asinovsky
(74) *Attorney, Agent, or Firm*—Ohlandt, Greeley, Ruggiero & Perle, L.L.P.

(57) ABSTRACT

Polymerizable ester surfactant, or a salt thereof, having the formula:

$$R^1\text{—}C(O)\text{—}R^2\text{—}X$$

wherein:
$R^1$ is an optionally substituted vinyl radical,
$R^2$ is a divalent polyoxyalkylene radical having at least two oxypropylene units, optional oxyethylene units in a block or random pattern, and a molar ratio oxypropylene units to oxyethylene units of at least about 2:1, preferably at least about 3:1, typically at least about 4:1 and more typically at least about 5:1, and
X is a phosphate group, wherein in the ester the monophosphate ester to di-phosphate ester weight ratio is greater than 80:20. These polymerizable surfactant compounds are useful as the sole surfactant in producing polymer latices by emulsion polymerization by polymerization of them with another polymerizable monomer.

31 Claims, No Drawings

POLYMERIZABLE COMPOUNDS AND USE THEREOF

This application claims the benefit of Provisional application Ser. No. 60/193,874, filed Mar. 31, 2000.

FIELD OF THE INVENTION

This invention relates to polymerizable compounds, some of which are surfactants, and to uses thereof, e.g. as an emulsifier in emulsion polymerization, and to latices produced by emulsion polymerization utilizing the polymerizable compounds.

BACKGROUND OF THE INVENTION

The use of latices, produced by emulsion polymerization, in the production of paints or coatings for substrates is well know in the art. However, adhesion of such paints or coatings to the substrates is generally adversely affected by the presence of emulsifiers required in the emulsion polymerization process. For example, such emulsifiers affect adhesion and particularly wet adhesion in numerous ways. The emulsifiers tend to migrate to the surface during the drying process and collect at the interface of the paint or coating and the substrate forming a layer that is of greater sensitivity to moisture and reduces adhesion. Additionally, many such emulsifiers are generally incompatible with the other coating or paint components and tend to segregate, carry water and cause haze formation. It is therefore desirable that there be available polymerizable monomers that enable one to eliminate or decrease the amount of such emulsifiers required in the emulsion polymerization process.

SUMMARY OF THE INVENTION

This invention provides a process for the production of high monoester content polyalkylene oxide (meth)acrylate polymerizable phosphate esters, and processes to produce emulsion polymers of such polymerizable monomers and the resulting emulsion polymer products. The polymerizable polyalkylene oxide (meth)acrylate polymerizable phosphate esters produced by the process of this invention have a high mono/di-ester content, i.e., 80/20 or greater, and produce emulsion polymers of greatly improved properties compared to emulsion polymers produced from phosphate esters of lower mono/di-ester content.

The method comprises reacting exclusively a stoichiometrically effective amount of phosphoric anhydride with phosphoric acid to produce a phosphation reagent having an effective equivalent polyphosphoric acid weight percent of from about 118 to 125, and reacting the phosphonation reagent with an alcohol medium of the formula $R^1$—C(O)—$R^2$—O—H, wherein $R^1$ and $R^2$ are as defined herein after, to produce a resulting ester composition wherein in the resulting ester compositions, the mono-ester to di-ester weight ratio is greater than 80:20 and the weight percent of the residual of said alcohol and phosphoric acid are individually each less than 6%, and the polymerizable compounds in the ester composition have the formula $$R^1\text{—C(O)—}R^2\text{—OPO}_3\text{H}_2$$

wherein:
$R^1$ is an optionally substituted vinyl radical, preferably $CH_2$=CH—, $CH_2$=C($CH_3$)—, or cis-CH(COOH)=CH—, and $R^2$ is a divalent polyoxyalkylene radical having at least two oxyalkylene units, preferably about 2 to about 50 oxyalkylene units, more typically about 2 to about 20 oxyalkylene units, e.g. (O—$CH_2CH_2$)$_n$ or (O—$CH_2$CH($CH_3$))$_n$ wherein n is from about 2 to about 50.

The invention further comprises a method of making an emulsion polymer comprising copolymerizing by emulsion polymerization a polymerizable surfactant, or a salt thereof, having the formula:

$$R^1\text{—C(O)—}R^2\text{—X}$$

wherein:
$R^1$ is an optionally substituted vinyl radical, preferably $CH_2$=CH—, $CH_2$=C($CH_3$)—, or cis-CH(COOH)=CH—, $R^2$ is a divalent polyoxyalkylene radical having at least two oxypropylene units, preferably about 2 to about 50 oxypropylene units, more typically about 2 to about 20 oxypropylene units, optional oxyethylene units in a block or random pattern, and a molar ratio oxypropylene units to oxyethylene units of at least about 2:1, preferably at least about 3:1, typically at least about 4:1 and more typically at least about 5:1, and X is a phosphate —OPO$_3$H$_2$ group, wherein in the ester the mono-phosphate ester to di-phosphate ester weight ratio is greater than 80:20 with at least one other polymerizable monomer.

DETAILED DESCRIPTION OF THE INVENTION

In one aspect, this invention relates to a method of making polymerizable phosphate ester compounds having the formula:

$$R^1\text{—C(O)—}R^2\text{—OPO}_3\text{H}_2$$

wherein:
$R^1$ is an optionally substituted vinyl radical, preferably $CH_2$=CH—, $CH_2$=C($CH_3$)—, or cis-CH(COOH)=CH—, and $R^2$ is a divalent polyoxyalkylene radical having at least two oxyalkylene units, preferably about 2 to about 50 oxyalkylene units, more typically about 2 to about 20 oxyalkylene units, e.g. (O—$CH_2CH_2$)$_n$ or (O—$CH_2$CH($CH_3$))$_n$ wherein n is from about 2 to about 50, wherein in the ester the mono-phosphate ester to di-phosphate ester weight ratio is greater than 80:20.

The polyoxyalkylene unit can be derived from a variety of epoxyalkane compounds including ethylene oxide, propylene oxide, butylene oxide, styrene oxide, other alkyl, cycloalkyl or aryl substituted alkyl oxides or alkyl or aryl glycidyl ethers. It may additionally include hydrocarbon chain segments such as might be derived from ring opening of caprolactone by 2-hydroxyethyl methacrylate.

The method comprises the steps of:

a) preparing a slurry or paste reagent composition by intimately blending and exclusively reacting, at from about room temperature to about 80° C. or the ultimate phosphation reaction temperature, an effective amount of phosphoric anhydride with from about 75 weight percent to about 117 weight percent phosphoric acid, said reagent composition having an effective equivalent polyphosphoric acid weight percent of from about 118 to about 125; and b) reacting said reagent composition with at least one alcohol of the formula $R^1$—C(O)—$R^2$—O—H, typically for a reaction time of from about 4 to about 12 hours;

wherein in the resulting ester compositions, the mono-ester to di-ester weight ratio is greater than 80:20 and the weight percent of the residual of said alcohol and phosphoric acid are individually each less than 6%.

In another aspect, this invention relates to a method of making polymerizable compounds having the formula:

$$R^1—C(O)—R^2—OPO_3H_2$$

wherein:

R$^1$ is an optionally substituted vinyl radical, preferably CH$_2$=CH—, CH$_2$=C(CH$_3$)—, or cis-CH(COOH)=CH—, and R$^2$ is a divalent polyoxyalkylene radical having at least two oxyalkylene units, preferably about 2 to about 50 oxyalkylene units, more typically about 2 to about 20 oxyalkylene units, e.g. (O—CH$_2$CH$_2$)$_n$ or (O—CH$_2$CH(CH$_3$))$_n$ wherein n is from about 2 to about 50;

said method comprising the steps of:

A) preparing a phosphoric acid-alcohol reactant solution by
  i) dissolving
    a) from about 75 weight % to about 117 weight % phosphoric acid in
    b) at least one alcohol medium of the formula R$^1$—C(O)—R$^2$—O—H, wherein R$^1$ and R$^2$ are as defined above, under essentially non-reactive temperature conditions;

B) then
  ii) intimately blending a stoichiometrically effective amount of phosphoric anhydride into said reactant solution and
  iii) reacting exclusively the phosphoric acid in said reactant solution with the stoichiometrically effective amount of phosphoric anhydride to produce in-situ a phosphation reagent having an effective equivalent polyphosphoric acid weight percent of from about 118 to 125; and C) reacting the phosphation reagent so produced with the alcohol medium, typically at from about 75° C. to about 100° C. for a reaction time of from about 4 to about 12 hours, wherein in the resulting ester compositions, the mono-ester to di-ester weight ratio is greater than 80:20 and the weight percent of the residual of said alcohol and phosphoric acid are individually each less than 6%.

Latices, water based dispersions of polymers obtained by emulsion polymerization, are widely used in various applications such as paints, adhesives, paper coatings, and carpet backing. Although some applications do not require it, the major property of the latex is its ability to bind various substrates. Thus, adhesion is a key factor, and one of the most difficult aspects is the wet adhesion. The latter is strongly affected by the presence of surfactant needed during the polymerization and remains one of the big challenges for latices. Surfactants affect adhesion and wet adhesion in various ways.

One way is by migrating to the interfaces during the drying process. At the interface between the coating and the substrate, it will reduce adhesion by forming double layers that are less adhesive and more sensitive to external water. This effect can totally ruin the properties of the coating. At the interface of coating/air, it reduces the interfacial tension of the coating, allows water to spread easily on the surface, and increases the water diffusion through this interface.

Another way is by forming interconnected clusters in the coating. Surfactants are very often incompatible with the coating and the pigments and have a tendency to segregate during and after the drying process. One of the negative aspects is that due to differences in refractive index, it will create haze in the coating, which is very detrimental in the clear coat type (adhesives for coatings). The major problem is the tremendous ability of these clusters to carry water throughout the film and to the interface film/substrate which impairs the mechanical properties, particularly adhesion, of the coating.

Beside this, surfactants can increase foaming and require the addition of a defoamer that may have other inconveniences such as the dewetting of the coating (such as the formation of fish eyes in the paint film). Finally, there are very often cross interactions in the coatings that may induce migration of the latex surfactants to the pigments leading to a destabilization of the paint. This phenomenon is detrimental to paint quality as well as to water resistance. Unfortunately, even though some trials have been done at the lab scale to run emulsion polymerization without surfactant, no known industrial process is known for doing so. Surfactant remains a necessary evil. Some decades ago, functional monomers with stabilizing groups (carboxylic, sulfate, sulfonate and the like) appeared and helped to reduce the amount of surfactant significantly thus improving properties. However, they are not surface active materials and thus are not able to stabilize the pre-emulsions of monomers or to be used solely during the nucleation period.

The high mono/di-ester polymerizable phosphated monomers of this invention makes it possible to eliminate traditional emulsifiers employed in emulsion polymerization and eliminate or avoid the problem or drawbacks associated with their presence in the resulting latices to be used for paints or coatings.

In another aspect, this invention relates to a method of making an emulsion polymer comprising copolymerizing by emulsion polymerization a polymerizable surfactant, or a salt thereof, having the formula:

$$R^1—C(O)—R^2—X$$

wherein:

R$^1$ is an optionally substituted vinyl radical, preferably CH$_2$=CH—, CH$_2$=C(CH$_3$)—, or cis-CH(COOH)=CH—, R$^2$ is a divalent polyoxyalkylene radical having at least two oxypropylene units, preferably about 2 to about 50 oxypropylene units, more typically about 2 to about 20 oxypropylene units, optional oxyethylene units in a block or random pattern, and a molar ratio oxypropylene units to oxyethylene units of at least about 2:1, preferably at least about 3:1, typically at least about 4:1 and more typically at least about 5:1, and X is a phosphate —OPO$_3$H$_2$ group, wherein in the ester the mono-phosphate ester to di-phosphate ester weight ratio is greater than 80:20 with at least one other polymerizable monomer The polymerizable surfactant can be made by different routes. For example, a preferred polymerizable surfactant wherein X is a phosphate —OPO$_3$H$_2$ group can be made by phosphation of the product of esterification of a polyalkylene glycol with a vinyl-functional carboxylic acid, or anhydride or acid halide thereof. The phosphation is preferably conducted as disclosed in U.S. Pat. Nos. 5,463,101, 5,550,274 and 5,554,781, as well as in EP Patent publication number EP 0 675,076 A2, especially as described in Example 18 of the EP publication. A polymerizable surfactant wherein X is a sulfate —OSO$_3$H$_2$ group or sulfonate —SO$_3$H group can be made by sulfating one of the hydroxyl groups of a polyalkylene glycol, or replacing said hydroxyl group with a sulfonate group, and then esterifying the remaining hydroxyl group of said polyalkylene glycol with a vinyl-functional carboxylic acid, or anhydride or acid halide thereof.

The polymerizable surfactants are ethylenically unsaturated and, thus, are polymerizable through this unsaturation. The monomer may be useful in a variety of homopolymers and copolymers, e.g. those produced by solution, bulk or suspension polymerization, but should be most useful as a comonomer in the production of latices of low crosslinking density through emulsion polymerization. Emulsion polymerization is discussed in G. Pohlein, "Emulsion Polymerization", *Encyclopedia of Polymer Science and Engineering,* vol. 6, pp. 1–51 (John Wiley & Sons, Inc., N.Y., N.Y., 1986), the disclosure of which is incorporated herein by reference. Emulsion polymerization is a heterogeneous reaction process in which unsaturated monomers or monomer solutions are dispersed in a continuous phase with the aid of an emulsifier system and polymerized with free-radical or redox intiators. The product, a colloidal dispersion of the polymer or polymer solution, is called a latex.

The comonomers which are typically employed include such monomers as methyl acrylate, ethyl acrylate, methyl methacrylate, butyl acrylate, 2-ethyl hexyl acrylate, other acrylates, methacrylates and their blends, acrylic acid, methacrylic acid, styrene, vinyl toluene, vinyl acetate, vinyl esters of higher carboxylic acids than acetic acid, e.g. vinyl versatate, acrylonitrile, acrylamide, butadiene, ethylene, vinyl chloride and the like, and mixtures thereof.

In the above process, suitable initiators, reducing agents, catalysts and surfactants are well known in the art of emulsion polymerization. Typical initiators include ammonium persulfate (APS), hydrogen peroxide, sodium, potassium or ammonium peroxydisulfate, dibenzoyl peroxide, lauryl peroxide, ditertiary butyl peroxide, 2,2'-azobisisobutyronitrile, t-butyl hydroperoxide, benzoyl peroxide, and the like.

Suitable reducing agents are those which increase the rate of polymerization and include for example, sodium bisulfite, sodium hydrosulfite, sodium formaldehyde sulfoxylate, ascorbic acid, isoascorbic acid, and mixtures thereof.

Suitable catalysts are those compounds which increase the rate of polymerization and which, in combination with the above-described reducing agents, promote decomposition of the polymerization initiator under the reaction conditions. Suitable catalysts include transition metal compounds such as, for example, ferrous sulfate heptahydrate, ferrous chloride, cupric sulfate, cupric chloride, cobalt acetate, cobaltous sulfate, and mixtures thereof.

Suitable surfactants which may be used in conjunction with the polymerizable surfactant include ionic and nonionic surfactants such as alkyl polyglycol ethers such as ethoxylation products of lauryl, tridecyl, oleyl, and stearyl alcohols; alkyl phenol polyglycol ethers such as ethoxylation products of octyl- or nonylphenol, diisopropyl phenol, triisopropyl phenol; alkali metal or ammonium salts of alkyl, aryl or alkylaryl sulfonates, sulfates, phosphates, and the like, including sodium lauryl sulfate, sodium octylphenol glycolether sulfate, sodium dodecylbenzene sulfonate, sodium lauryldiglycol sulfate, and ammonium tritertiarybutyl phenol and penta- and octa-glycol sulfonates, sulfosuccinate salts such as disodium ethoxylated nonylphenol half ester of sulfosuccinic acid, disodium n-octyldecyl sulfosuccinate, sodium dioctyl sulfosuccinate, and the like.

A typical process of emulsion polymerization preferably involves charging water to a reactor and feeding as separate streams a pre-emulsion of the monomers and a solution of the initiator. A small amount of the pre-emulsion and a portion of the initiator may be charged initially at the reaction temperature to produce a "seed" latex. The "seed" latex procedure results in better particle-size reproducibility. Under "normal" initiation conditions, that is initiation conditions under which the initiator is activated by heat, the polymerization is normally carried out at about 60–90° C. A typical "normal" initiated process, for example, could employ ammonium persulfate as initiator at a reaction temperature of 80±2° C. Under "redox" initiation conditions, that is initiation conditions under which the initiator is activated by a reducing agent, the polymerization is normally carried out at 60–70° C. Normally, the reducing agent is added as a separate solution. A typical "redox" initiated process, for example, could employ potassium persulfate as the initiator and sodium metabisulfite as the reducing agent at a reaction temperature of 65±2° C.

In the above emulsions, the polymer preferably exists as a generally spherical particle, dispersed in water, with a diameter of about 50 nanometers to about 500 nanometers. Gel content can be determined using the method taught in U.S. Pat. No. 5,371,148, incorporated herein by reference. Glass transition temperature ($T_g$) is a calculated number based on the proportion of each monomer utilized and the corresponding $T_g$ for a homopolymer of such a monomer. In addition to making emulsion polymers, it is contemplated that the polymerizable surfactants of the present invention can be used to form solution copolymers.

In particular, the polymerizable surfactants of this invention may be incorporated in effective amounts in aqueous polymer systems to enhance the stability of emulsions of the polymers. The commonly used monomers in making acrylic paints are butyl acrylate, methyl methacrylate, ethyl acrylate and the like. In acrylic paint compositions the polymer is comprised of one or more esters of acrylic or methacrylic acid, typically a mixture, e.g. about 50/50 by weight, of a high $T_g$ monomer (e.g. methyl methacrylate) and a low $T_g$ monomer (e.g. butyl acrylate), with small proportions, e.g. about 0.5% to about 2% by weight, of acrylic or methacrylic acid. The vinyl-acrylic paints usually include vinyl acetate and butyl acrylate and/or 2-ethyl hexyl acrylate and/or vinyl versatate. In vinyl-acrylic paint compositions, at least 50% of the polymer formed is comprised of vinyl acetate, with the remainder being selected from the esters of acrylic or methacrylic acid. The styrene/acrylic polymers are typically similar to the acrylic polymers, with styrene substituted for all or a portion of the methacrylate monomer thereof.

EXAMPLE 1

Phosphation of Pentaethylene Glycol Monomethacrylate

A 500 mL round bottomed, 4 necked flask was fitted with a thermocouple, paddle stirrer, glass stopper and Claisen head with an argon inlet needle projecting into the flask and outlet through a silicone oil filled bubbler tub. The apparatus had been oven dried overnight, assembled while warm, filled with an argon atmosphere and heated by a 250 watt infrared lamp to minimize moisture contamination. A 63.48 g charge of 115% polyphosphoric acid was quickly added through the unstoppered neck against a positive argon flow followed by 306.36 g pentaethylene glycol monomethacrylate (Sipomer HEM-5, Rhodia, Inc.) and 0.15 g phenothiazine. The contents of the promptly restoppered flask were stirred to dissolve the acid under ambient temperature with the liquor temperature reaching a maximum of 42° C. in eight minutes. The stopper was replaced be a corkscrew feed powder addition funnel containing phosphoric anhydride, the liquor allowed to cool to 30° C. and 18.01 g was added over a 10 minute interval. The liquor temperature rose to 45° in 15 minutes, then was heated by an external, thermostatically controlled oil bath to 70° C. held for two hours and heated to 80° C., where it was maintained for 11 hours. Deionized water, 0.53 g, was added, heating and stirring at 80° C. was continued for another hour and the dark liquor was cooled and bottled.

EXAMPLE 2

Phosphation of Pentapropylene Glycol Monomethacrylate

A 500 mL round bottomed, 4 necked flask was fitted with a thermocouple, paddle stirrer, pressure equalizing funnel and Claisen head with a dry air inlet needle and outlet through a silicone oil filled bubbler tub. The apparatus had been oven dried and assembled while hot to exclude moisture contamination. The flask was charged with 209.26 g pentapropylene glycol monomethacrylate (Bisomer PPM-5S, Laporte Performance Chemicals U.K.). Stirring and a slow flow of dry air into the liquor were started. The 115% polyphosphoric acid, 29.85 g, was added from the addition funnel over a 15 minute period, during which the liquor temperature increased from 20° C. to 36° C. The liquid addition funnel was replaced by a screw feed powder addition funnel containing phosphoric anhydride. The flask was partially immersed in an ambient room temperature oil bath and 16.08 g phosphoric anhydride was added over a six minute period. The powder dispersed readily in the clear, colorless solution with the temperature reaching a maximum of 43° C. The liquor was then heated to 80° C. and maintained there for 24 hours. The $^{31}$P nuclear magnetic resonance spectrum showed conversion to 90% orthophosphates and 10% residual pyrophosphates, so 1.28 g deionized water was added, heating and stirring continued for another two hours and the liquor was cooled and bottled.

The structure of the phosphate ester of polypropylene glycol (5) methacrylate (HPM5P) produced in Example 2 is.

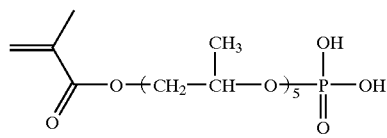

EXAMPLE 3

This example demonstrates that this compound of Example 2 stabilizes a pre-emulsion of monomers such as methyl methacrylate (MMA), butyl acrylate (BA), and methacrylic acid (MAA). The recipe for the pre-emulsion is:

TABLE I

| Pre-emulsification of Monomer Blend | |
|---|---|
| Material Name*[1] | Weight (g) |
| MMA | 260.0 |
| BA | 235.0 |

TABLE I-continued

| Pre-emulsification of Monomer Blend | |
|---|---|
| Material Name*[1] | Weight (g) |
| MAA | 5.0 |
| DI Water | 191.1 |
| HPM5P*[2] | 10.0 |

*[1]Monomer composition: MMA/BA/MAA = 52/47/1 (weight ratio).
*[2]Dispersed in water at 50/50 weight ratio, and neutralized to pH ~7 by concentrated ammonia. The total HPM5P amount is 1.0% based on total monomer (BOTM).

A small lab homogenizer (Ultra-Turrax T25 Homogenizer by IKA-Labortechnik), was used and a stable pre-emulsion was obtained which was useful for emulsion polymerization (>3 hours without separation). Some HPM5P monomer is still needed for the nucleation step. In the initial charge 0.2% BOTM of HPM5P was used. The complete protocol is given below:

TABLE II

| Surfactant-Free Emulsion Polymerization | | | |
|---|---|---|---|
| | Weight | Solid weight | % BOTM |
| A. Kettle charge | | | |
| DI Water | 200.0 g | | |
| HPM5P* | 2.0 g | 1.0 | 0.2 |
| B. Monomer emulsion* | | | |
| MAA | 5.0 g | 5.0 | 1.0 |
| MMA | 260.0 g | 260.0 | 52.0 |
| BA | 235.0 g | 235.0 | 47.0 |
| DI Water | 191.1 g | | |
| HPM5P* | 10.0 g | 5.0 | 1.0 |
| C. Initiator solution | | | |
| Ammonium persulfate (APS) | 2.0 g | 2.0 | 0.4 |
| DI Water | 90.0 g | | |
| Total | 995.1 g | 508.0 | |
| Theoretical % Solids: 51.05% | | | |

Procedure:
1. Heat the kettle charge to 82° C.; Add 23.0 g C (25%) and 28.0 g B (4%); Hold the temperature at 80° C. for 15 minutes.
2. Add the remainder C and B over 2.5–3 hrs. Keep 80° C. during the addition.
3. Raise the temperature to 85° C. after the addition is completed. Hold at 85° C. for 30 minutes.
4. Cool down to room temperature and adjust the pH to 9.0 (+/−0.2) using 28% ammonia solution.

*50% solution

The emulsion polymerization went very well. The results are shown in the Table III.

TABLE III

| Surfactant-Free Emulsion Polymerization Results* | |
|---|---|
| % Emulsifier (monomer/kettle) | 1.0%/0.2% |
| PH (init./Adj.) | 4.0/8.8 |
| Solids/Conv., % | 50.7/99.3 |
| Wet Coagulum, % | 0.19 |
| Nicomp Mean particle size, nm | 208 ± 19 |

TABLE III-continued

Surfactant-Free Emulsion Polymerization Results*

| | |
|---|---|
| Surface tension mN/m | 59.8 |
| Freeze/Thaw (# cycles) | 5+ |

*52 MMA/47BA/1MAA; 80° C. thermal process; 25% initiator solution/ 4% ME in seed; 1.2% HPM5P BOTM.

The results indicate the following.

HPM5P monomer acts as a good primary surfactant since the particle size is correct (200 nm).

HPM5P is a good stabilizer since the total coagulum remains low.

The emulsion had excellent mechanical and freeze/thaw stability.

Foaming is much lower than with the control latex and foam disappears more rapidly.

Moreover, the particle size distribution is much narrow than is generally observed with standard surfactants. Among these properties is a significant advantage in regard to freeze/thaw stability, with the latex passing 5+ F/T cycles. This latex has lower foam, better mechanical stability, and gives the coating better wet adhesion and gloss compared to a conventional standard latex made using essentially the same process but with a conventional surfactant such as RHODAFAC brand RD610 phosphate ester surfactant (see Tables IV and V).

TABLE IV

Foam Test and Mechanical Stability Test Results

| | Surfactant free latex of the invention | Standard latex with surfactant |
|---|---|---|
| Foam height (in.) | 1⅛ | 1½ |
| Density | Low | Medium |
| Duration (minutes) | 4 | Remained 1⅜ in. after 4 minutes |
| Mechanical Stability (Waring Blender 22k rpm) | 10 min-Failure by Visc. Rise (redispersible) | Latex broke in 5 minutes |
| Gloss (20°/60°) (For latex draw down) | 42/78 | 16/64 |

TABLE V

Coatings properties of the surfactant free latex versus standard latex*

| | Surfactant free latex of the invention | Standard latex with surfactant |
|---|---|---|
| Dry adhesion (ASTM D3359) | 3B | 2B |
| Wet adhesion (ASTM D3359) | 3B | 0B |

*On Al panel

EXAMPLE 4

The phosphate ester of hexaethylene glycol monomethacrylate was prepared according to the procedure set forth in Example 2 by substituting hexaethylene glycol monomethacrylate for pentapropylene glycol monomethacrylate and obtaining a product having a mono-phosphate ester to di-phosphate ester weight ratio of about 85:15.

EXAMPLE 5

Comparative testing was undertaken to demonstrate the lower viscosity, ease of handling and absence of gelling characteristics of the high mono-phosphate ester compounds of this invention compared to similar phosphate ester compounds but containing a higher level of di-phosphate ester.

For the comparison 0.72 g (2% of total monomer) of the monomer of Example 3, 35.28 g (98% of total monomer) methylmethacrylate monomer, 0.11 g AIBN (azobisisobutyronitrile) catalyst and 83.89 g THF reaction solvent were place in closed. reaction vessel equipped with a magnetic stirrer. After bubbling nitrogen though the reaction vessel it was placed on an oil bath at 60° C. for about 24 hrs with constant spinning of the magnetic stirrer, after which the solution polymerization product was observed. A similar solution polymerization was conducted employing phosphate ester of hexaethylene glycol monomethacrylate having a mono-phosphate ester to di-phosphate ester weight ratio of about 50:50. The polymerization product of the about 50:50 ratio monomer was a non-pourable gel difficult to remove from the reaction vessel, while the polymerization product of the about 85:15 ratio monomer was a liquid easily transferable from the reaction vessel. Rheological profiles of these two products were generated. At 1 rad/sec the polymer from the about 50:50 monomer measures 297 Pascal/sec, while the polymer from the about 85:15 monomer measures 26 Pascal/sec. This observation and data demonstrate a significant advantage of the monomers of this invention and the solution polymerized polymers produced therefrom compared to the monomers of high di-phosphate ester content and the solution polymerized polymers produced therefrom. Gellation in the polymers is generally undesirable and results in product that is essentially impossible to transfer from the polymerization vessel, and is otherwise difficult to handle. Moreover, such a gel state polymer would be essentially impossible to formulate into any kind of coating product.

Having described the invention in detail by reference to the preferred embodiments and specific examples thereof, it will be apparent that modifications and variations are possible without departing from the spirit and scope of the disclosure and claims.

What is claimed is:

1. A method of making an emulsion polymer comprising copolymerizing by emulsion polymerization:
    (a) a polymerizable ester surfactant, or a salt thereof, having the formula:

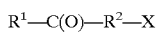

$R^1$—C(O)—$R^2$—X wherein:
    $R^1$ is an optionally substituted vinyl radical,
    $R^2$ is a divalent polyoxyalkylene radical having at least two oxypropylene units, optional oxyethylene units in a block or random pattern, and a molar ratio oxypropylene units to oxyethylene units of at least about 2:1 when oxyethylene units are present;
    X is a phosphate group, wherein in the ester the mono-phosphate ester to di-phosphate ester weight ratio is greater than 80:20; with
    (b) at least one other polymerizable monomer.

2. A method according to claim 1 wherein $R^1$ is selected from the group consisting of $CH_2$=CH—, $CH_2$=C($CH_3$)—, or cis-CH(COOH)=CH—.

3. A method according to claim 1 wherein $R^2$ has about 2 to about 50 oxypropylene units.

4. A method according to claim 3 wherein $R^2$ has about 2 to about 20 oxypropylene units.

5. A method according to claim 4 wherein the molar ratio of oxypropylene units to oxyethylene units is at least 3:1.

6. A method according to claim 5 wherein the molar ratio of oxypropylene units to oxyethylene units is at least 4:1.

7. A method according to claim 6 wherein the molar ratio of oxypropylene units to oxyethylene units is at least 5:1.

8. In a method of making an emulsion polymer by emulsion polymerization, the improvement comprising using, as an emulsifier, a polymerizable surfactant, or a salt thereof, having the formula:

$$R^1-C(O)-R^2-X$$

wherein:
- $R^1$ is an optionally substituted vinyl radical,
- $R^2$ is a divalent polyoxyalkylene radical having at least two oxypropylene units, optional oxyethylene units in a block or random pattern, and a molar ratio oxypropylene units to oxyethylene units of at least about 2:1 when oxyethylene units are present, and
- X is a phosphate group and wherein in the ester the mono-phosphate ester to di-phosphate ester weight ratio is greater than 80:20.

9. A method of claim 8 wherein said polymerizable surfactant is the sole emulsifier used in said method.

10. A method of claim 8 wherein one or more other emulsifiers are also used.

11. A method according to claim 8 wherein $R^1$ is selected from the group consisting of $CH_2=CH-$, $CH_2=C(CH_3)-$, or $cis\text{-}CH(COOH)=CH-$.

12. A method according to claim 8 wherein $R^2$ has about 2 to about 50 oxypropylene units.

13. A method according to claim 12 wherein $R^2$ has about 2 to about 20 oxypropylene units.

14. A method according to claim 13 wherein the molar ratio of oxypropylene units to oxyethylene units is at least 3:1.

15. A method according to claim 14 wherein the molar ratio of oxypropylene units to oxyethylene units is at least 4:1.

16. A method according to claim 15 wherein the molar ratio of oxypropylene units to oxyethylene units is at least 5:1.

17. A method of making polymerizable compounds having the formula:

$$R^1-C(O)-R^2-OPO_3H_2$$

wherein:
- $R^1$ is an optionally substituted vinyl radical,
- $R^2$ is a divalent polyoxyalkylene radical having at least two oxyalkylene units, said method comprising the steps of:
  a) preparing a slurry or paste reagent composition by intimately blending and exclusively reacting, at from about room temperature to about 80° C. or the ultimate phosphation reaction temperature, an effective amount of phosphoric anhydride with from about 75 weight percent to about 117 weight percent phosphoric acid, said reagent composition having an effective equivalent polyphosphoric acid weight percent of from about 118 to about 125; and
  b) reacting said reagent composition with at least one alcohol of the formula $R^1-C(O)-R^2-O-H$, for a reaction time of from about 4 to about 12 hours; wherein in the resulting ester compositions, the mono-ester to di-ester weight ratio is greater than 80:20 and the weight percent of the residual of said alcohol and phosphoric acid are individually each less than 6%.

18. A method of claim 17 wherein the oxyalkylene units are selected from the group consisting of $(O-CH_2CH_2)_n$ or $(O-CH_2CH(CH_3))_n$ units where n is from about 2 to about 50.

19. A method of making polymerizable compounds having the formula:

$$R^1-C(O)-R^2-OPO_3H_2$$

wherein:
- $R^1$ is an optionally substituted vinyl radical, and
- $R^2$ is a divalent polyoxyalkylene radical having at least two oxyalkylene units, said method comprising the steps of:
  A) preparing a phosphoric acid-alcohol reactant solution by
    i) dissolving
      a) from about 75 weight % to about 117 weight % phosphoric acid in
      b) at least one alcohol medium of the formula $R^1-C(O)-R^2-OH$, wherein $R^1$ and $R^2$ are as defined above, under essentially non-reactive temperature conditions:
  B) i) intimately blending into said reactant solution and
    ii) reacting exclusively the phosphoric acid in said reactant solution with a stoichiometrically effective amount of phosphoric anhydride to produce in-situ a phosphation reagent having an effective equivalent polyphosphoric acid weight percent of from about 118 to 125; and
  C) reacting the phosphation reagent so produced with the alcohol medium, typically at from about 75° C. to about 100° C. for a reaction time of from about 4 to about 12 hours, wherein in the resulting ester compositions, the mono-ester to di-ester weight ratio is greater than 80:20 and the weight percent of the residual of said alcohol and phosphoric acid are individually each less than 6%.

20. A polymerizable ester surfactant, or a salt thereof, having the formula:

$$R^1-C(O)-R^2-X$$

wherein:
- $R^1$ is an optionally substituted vinyl radical,
- $R^2$ is a divalent polyoxyalkylene radical having at least two oxypropylene units, optional oxyethylene units in a block or random pattern, and a molar ratio oxypropylene units to oxyethylene units of at least about 2:1 when oxyethylene units are present, and
- X is a phosphate group, wherein in the ester the mono-phosphate ester to di-ester weight ratio is greater than 80:20.

21. A polymerizable ester surfactant of claim 20 wherein $R^1$ is selected from the group consisting of $CH_2=CH-$, $CH_2=C(CH_3)-$, or $cis\text{-}CH(COOH)=CH-$.

22. A polymerizable ester surfactant of claim 20 wherein $R^2$ has about 2 to about 50 oxypropylene units.

23. A polymerizable ester surfactant of claim 22 wherein $R^2$ has about 2 to about 20 oxypropylene units.

24. A polymerizable ester surfactant of claim 23 wherein the molar ratio of oxypropylene units to oxyethylene units is at least 3:1.

25. A polymerizable ester surfactant of claim 24 wherein the molar ratio of oxypropylene units to oxyethylene units is at least 4:1.

26. A polymerizable ester surfactant of claim 24 wherein the molar ratio of oxypropylene units to oxyethylene units is at least 5:1.

27. A polymerizable ester or a salt thereof of the formula:

$$R^1-C(O)-R^2-X$$

wherein:

$R^1$ is an optionally substituted vinyl, $R^2$ is a divalent polyoxyethylene radical, and X is a phosphate group, wherein in the ester the mono-phosphate ester to di-phosphate ester weight ration is greater than 80:20.

28. A polymerizable ester or salt thereof of claim 27 wherein $R^1$ is selected from the group consisting of $CH_2=CH-$, $CH_2=C(CH_3)-$ or $CH(COOH)=CH-$.

29. A polymerizable ester or salt thereof of claim 28 wherein $R^2$ is $-(O-CH_2CH_2)_n-$ where n is from about 2 to about 50.

30. A polymerizable ester or salt thereof of claim 29 wherein $R^1$ is $CH_2=C(CH_3)-$ and n is 6.

31. A polymerizable ester or salt thereof of claim 30 wherein the weight ratio of mono to di ester is about 85:15.

* * * * *